United States Patent [19]
Kallin

[11] Patent Number: 5,287,545
[45] Date of Patent: Feb. 15, 1994

[54] METHOD OF AND APPARATUS FOR ADVANCED DIRECTED RETRY

[75] Inventor: Harald Kallin, Sollentuna, Sweden

[73] Assignee: Telefonaktiebolaget L M Ericsson, Stockholm, Sweden

[21] Appl. No.: 808,778

[22] Filed: Dec. 17, 1991

[51] Int. Cl.⁵ .......................................... H04Q 7/00
[52] U.S. Cl. ............................ 455/33.1; 455/56.1; 455/58.2; 379/59
[58] Field of Search ............ 455/58.1, 58.2, 54.1, 455/54.2, 56.1, 34.2, 33.2, 34.1, 33.1; 379/60, 59

[56] References Cited

U.S. PATENT DOCUMENTS

| | | | |
|---|---|---|---|
| 3,913,017 | 10/1975 | Imaseki | 455/52 |
| 4,670,899 | 6/1987 | Brody et al. | 379/60 |
| 4,718,081 | 1/1988 | Brenig | 379/60 |
| 4,775,999 | 10/1988 | Williams | 379/59 |
| 4,829,554 | 5/1989 | Barnes et al. | 379/58 |
| 4,893,327 | 1/1990 | Stern et al. | 379/59 |

*Primary Examiner*—Reinhard J. Eisenzopf
*Assistant Examiner*—Andrew Faile
*Attorney, Agent, or Firm*—Burns, Doane, Swecker & Mathis

[57] ABSTRACT

According to the cellular mobile radiotelephone call access method of the present invention, a directed retry message is sent in response to an attempted call access in a first cell experiencing congestion. A subsequent retry and a second cell of the attempted call access is detected, and, if a traffic channel allocated to the first cell is then available, a traffic channel allocated to the first cell is assigned from the second cell. The call is therefore established in the original cell more often, and interference is reduced.

18 Claims, 6 Drawing Sheets

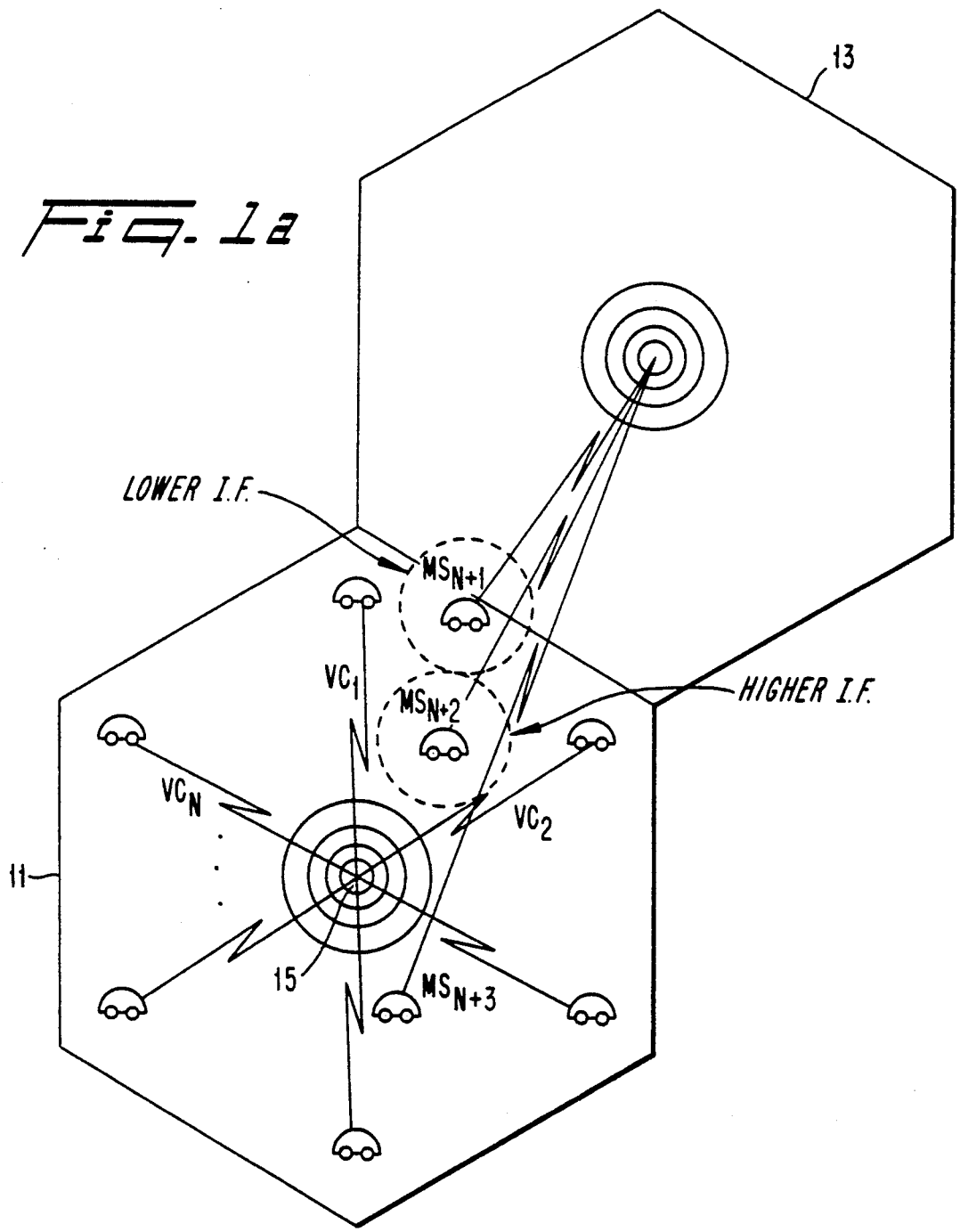

| $T_1T_2$ = 10 | SCC = 11 | CHANPOS | CHANPOS | CHANPOS | RSVD = 000 | P |
|---|---|---|---|---|---|---|
| 2 | 2 | 7 | 7 | 7 | 3 | 12 |

| $T_1T_2$ = 10 | SCC = 11 | CHANPOS | CHANPOS | CHANPOS | RSVD = 000 | P |
|---|---|---|---|---|---|---|
| 2 | 2 | 7 | 7 | 7 | 3 | 12 |

Fig. 3

WORD 1

| SCM | MOBILE STATION NUMBER (7 DIGITS) | PARITY |
|---|---|---|
| 8  4 | 24 | 12 |

WORD 2

| ORDER | | | | MOBILE STATION NUMBER (3 DIGITS) | PARITY |
|---|---|---|---|---|---|
| 9 | 3 | 5 | 1  8 | 10 | 12 |

WORD 3

| | SERIAL NUMBER | PARITY |
|---|---|---|
| 4 | 32 | 12 |

WORD 4 (DIALLED NUMBER)

| 1ST DIGIT | 2ND DIGIT | --- | --- | --- | --- | --- | 7TH DIGIT | 8TH DIGIT | PARITY |
|---|---|---|---|---|---|---|---|---|---|
| 4 | 4 | 4 | 4 | 4 | 4 | 4 | 4 | 4 | 12 |

WORD 5 (DIALLED NUMBER)

| 9TH DIGIT | 10TH DIGIT | --- | --- | --- | --- | --- | 15TH DIGIT | 16TH DIGIT | PARITY |
|---|---|---|---|---|---|---|---|---|---|
| 4 | 4 | 4 | 4 | 4 | 4 | 4 | 4 | 4 | 12 |

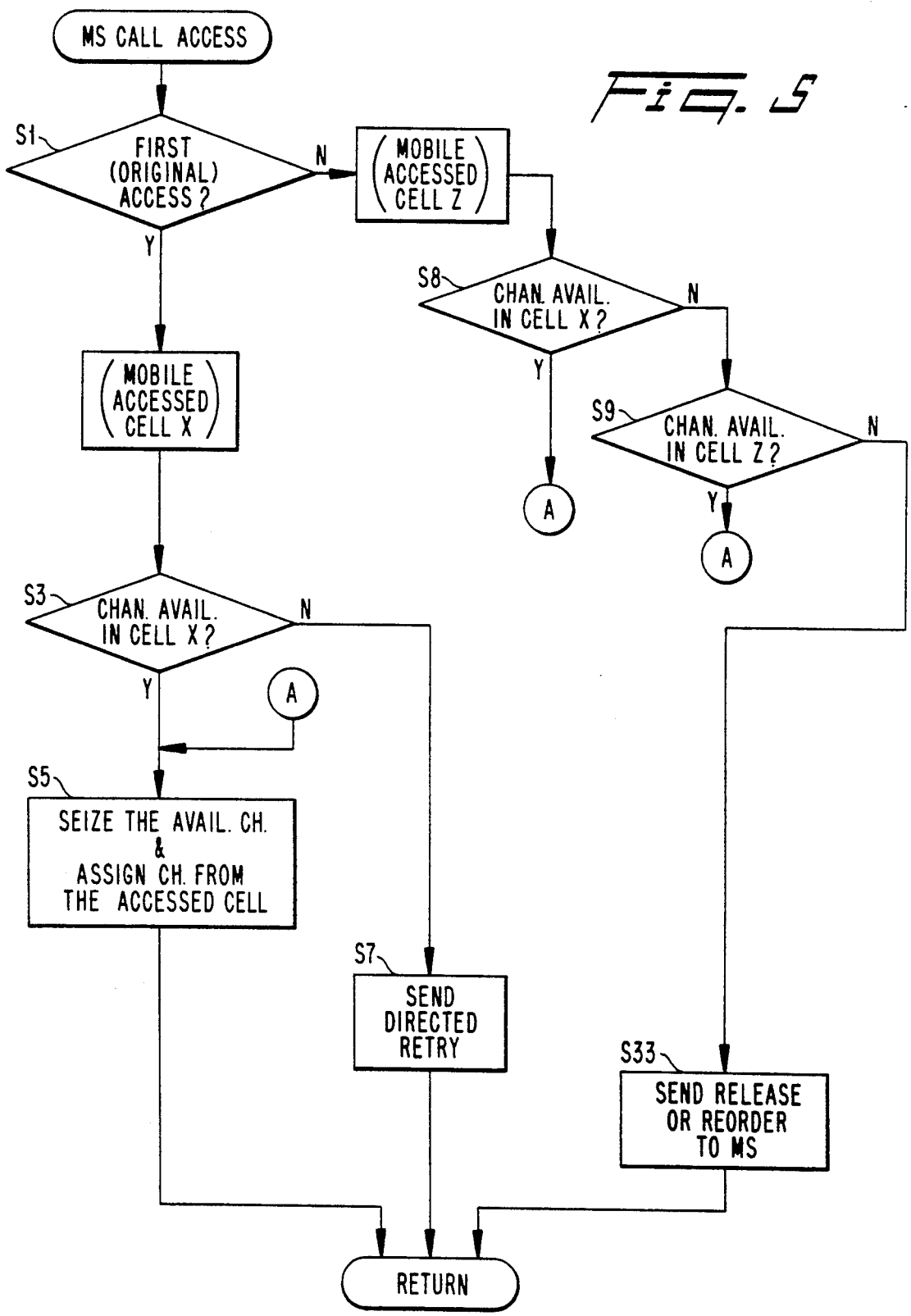

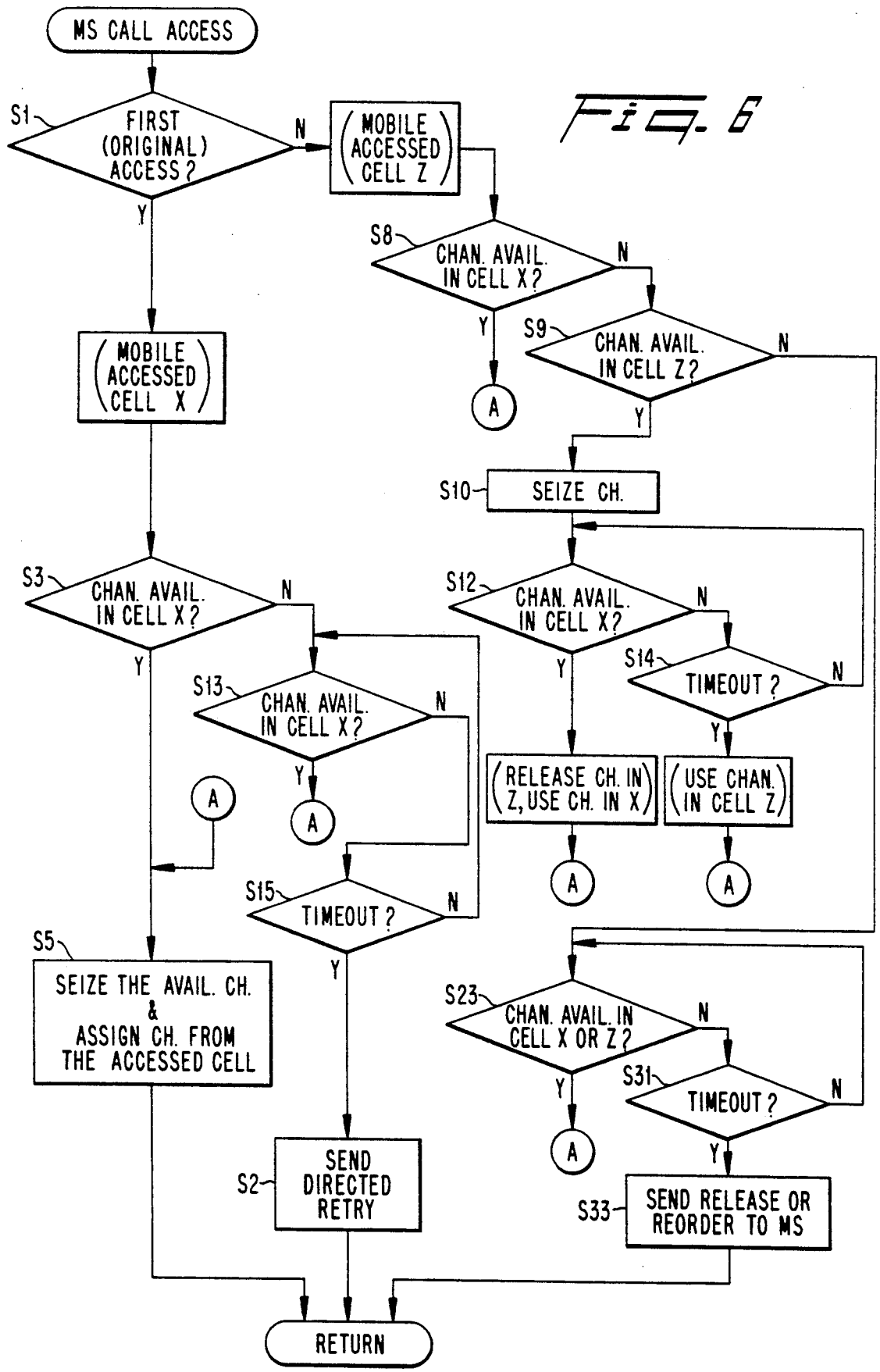

METHOD OF AND APPARATUS FOR ADVANCED DIRECTED RETRY

BACKGROUND OF THE INVENTION

The present invention relates to interference reduction in a cellular mobile radiotelephone system and more particularly to reduction of interference in such a system resulting from a conventional, unrestricted directed retry function.

In mobile radiotelephone systems, one of the main technological challenges is to provide a sufficiently large number of radio channels to meet system demand while at the same time minimizing interference of those channels with one another. In cellular mobile radiotelephone systems, this problem has been addressed by allocating frequencies to cells according to a frequency reuse pattern such that a specified distance, known as the frequency reuse distance, separates geographical areas using a common frequency. Such a technique has proven effective in preventing undue interference of same-frequency channels.

Interference can also occur, however, between different frequency channels assigned to adjacent cells. Normally, transmission power on cell transmitters is regulated so as to minimize such interference. If, however, a mobile station transmitting on the frequency of one of two adjacent cells is located relatively far inside the interior of another of the two adjacent cells, the mobile station becomes a local interference radiator, and interference may become quite pronounced.

Such a situation may arise, for example, when a call access is attempted at a time when all of a cell's voice channels are occupied (cell congestion). The switching center typically responds to such a situation by sending a "directed retry" instruction to the mobile station attempting access together with a list of the frequencies of all of the congested cell's neighboring cells. The mobile station then monitors reception on each of the neighboring cell's frequencies and chooses a strongest received frequency on which to reattempt access. Given a flat topography, the frequency chosen will usually be that of the neighboring cell closest to the mobile station. Because of varying topography, however, the propagation paths and resulting signal strengths may also vary such that the strongest received channel may not always be that of the closest neighboring cell but rather may be that of a more distant neighboring cell. This increases the potential for audible interference.

SUMMARY OF THE INVENTION

According to the cellular mobile radiotelephone call access apparatus and method of the present invention, a directed retry message is sent in response to an attempted call access in a first cell experiencing congestion. A subsequent retry in a second cell of the attempted call access is detected, and, if a traffic channel allocated to the first cell is then available, a traffic channel allocated to the first cell is assigned from the second cell. The call is therefore established in the original cell, reducing interference.

BRIEF DESCRIPTION OF THE DRAWINGS

FIG. 1a is a diagrammatic representation of how directed retry can cause interference in a cell;

FIG. 3 is a representation of an access message from a mobile station;

FIG. 5 is a flowchart representation of a call access method without queuing according to the present invention; and FIG. 6 is a flowchart representation of a call access method with queuing according to the present invention.

DETAILED DESCRIPTION OF THE PREFERRED EMBODIMENTS

Figures 1B, 4:
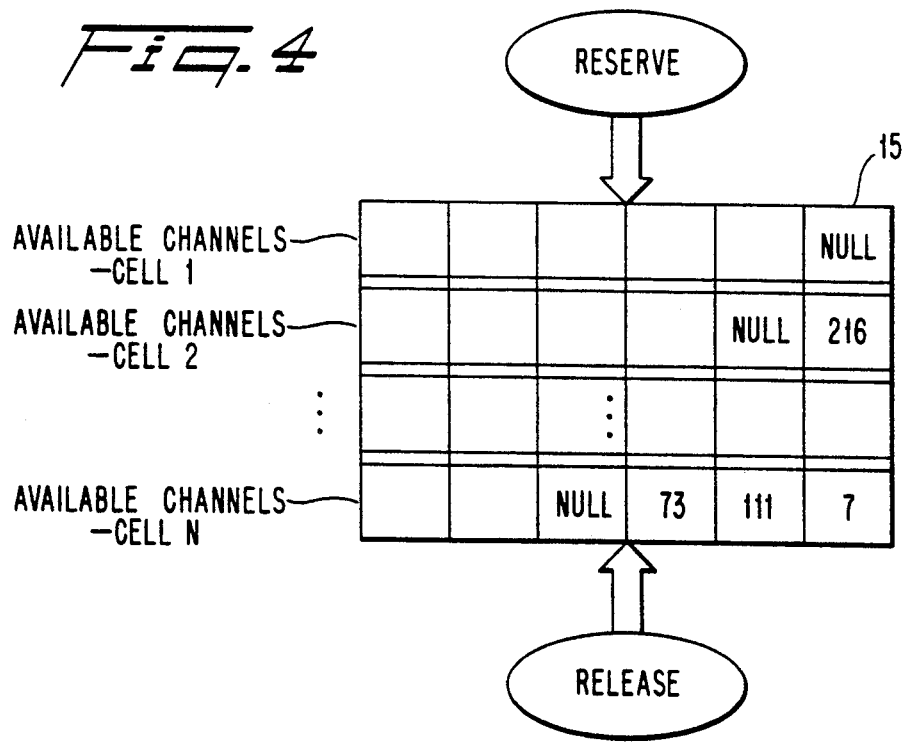
FIG. 1b is a representation of a directed retry message sent from a mobile services center to a mobile station.
FIG. 4 is a representation of how channels may be cooperatively reserved and released.

Referring now to FIG. 1a, a cell such as cell 11 of a cellular mobile radiotelephone system experiences congestion when it receives a service request from a mobile station at a time when all of the voice channels of the cell are occupied. Assuming voice channels 1-N of the cell to be occupied by mobile stations $MS_1$-$MS_n$, N representing a maximum number of channels of the cell, congestion is experienced when the cell receives a service request from a mobile station $MS_{N+1}$. The mobile station $MS_{N+1}$ is illustrated as being located near the periphery of the cell 11. A mobile station attempting access during congestion may just as easily be located near the interior of the cell 11 as is the case illustrated by mobile stations $MS_{N+2}$ and $MS_{N+3}$. In each of the foregoing cases, the switching center 15 in a conventional cellular mobile radiotelephone system will send to the mobile station a directed retry message as illustrated in FIG. 1b.

Referring to FIG. 1b, the directed retry message (or most pertinent portion thereof) may be formatted, for example, as two 40-bit words of identical format divided into segments as illustrated in the figure. The message preamble consists of four bits, two bits identifying the word as either a single-word message, the first word in a multi-word message or the second word in a multi-word message, and the following two bits containing an SCC field not important to an understanding of the present invention.

The message postamble contains three reserved bits and a 12-bit parity field. The main portion of the message, consisting of three 7-bit segments, identifies three channels of three neighboring cells in terms of an offset relative to a first access channel used in the system. The second word of the directed retry message assumes the same form as the first word, but identifies three additional channels for a total of six. In response to the directed retry message, the mobile station monitors received signal strengths on each of the identified channels and selects the strongest received channel to reattempt its previous service request.

In an ideal radio environment, the channel selected in response to the directed retry message would always be that of the neighboring cell nearest the mobile station $MS_{N+1}$, cell 13 in the example of FIG. 1a. The mobile station $MS_{N+1}$ may nevertheless be located near the periphery or near the interior of the cell 11 which it occupies. If located near the periphery, the mobile station $MS_{N+1}$ will usually not cause major local interference. If located near the interior, however, the probability is much greater that the mobile station $MS_{N+1}$ will create significant local interference.

Because of numerous obstacles to radio transmission, the channel selected will not always be that of the neighboring cell closest to the mobile station. Accordingly, it will sometimes happen that the mobile station will retry cross-cell with the result that a call is established far from the assigned area of the cell handling the call. In such an instance, the possibility for disruptive interference is at its greatest.

An interval of time, typically about 2 seconds, occurs between the sending of a directed retry message and actual channel assignment following directed retry. It may happen that during this interval a voice channel becomes newly available in the original cell. By assigning the newly available voice channel to the mobile station instead of the alternative out-of-cell channel, interference may be reduced. The assignment may be made from a neighboring cell in identical fashion as if the alternate channel were to be assigned.

It would be possible for one having ordinary skill in the art to implement a call access method according to the present invention by modifying only the software. On the other hand, it would also be possible to implement the method using a combination of hardware and software modifications. In either case, an understanding of the hardware interface between the central processor of the mobile services center and the control units of a base station will assist in understanding the invention.

Figure 2:
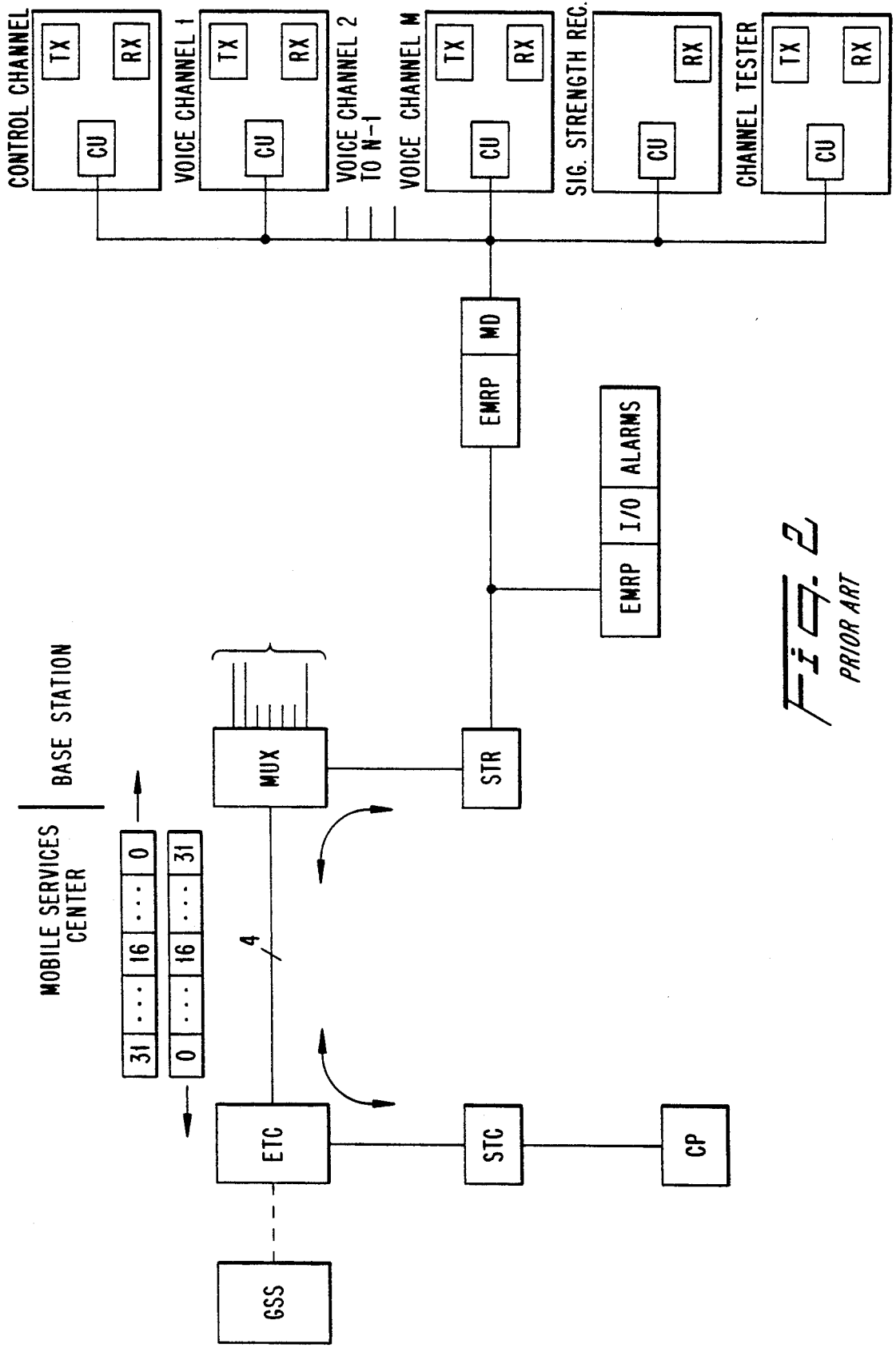
FIG. 2 is a block diagram of the hardware interface between the central processor of the mobile services center and the control units of a base station in a mobile radiotelephone system.

Referring now to FIG. 2, control communications between the mobile services center and a base station of a known mobile radiotelephone system are carried out across a predetermined channel (in this instance, channel 16) of a larger number of channels (in this instance, 32) defined by respective time slots in time-division multiplex fashion and comprising a communications frame exchanged between the mobile services center and the base station on a four-wire line. Slot communications functions are handled by an exchange terminal circuit ETC on the mobile services center side and by a multiplexer MUX on the base station side. Data communications are formatted according to the CCITT 7 standard by a signalling terminal central STC on the mobile services center side and a signalling terminal regional STR on the base station side. Overall control of the mobile services center and the base station is performed by a central processor CP of the mobile services center. Voice communications, however, are not directly handled by the central processor CP but pass uninterrupted through the multiplexer MUX and the exchange terminal circuit ETC to a group switching subsystem GSS for proper call routing.

The base station includes a number of autonomous channel units typically including a radio transmitter TX and a radio receiver RX controlled by a control unit CU. In addition to a number of voice channels, M, there is provided a control channel, a channel tester, and a signal strength receiver, which has a control unit and a radio receiver but no transmitter. The control channel is used, among other things, to set up calls across the various voice channels. The channel tester allows trouble-shooting and diagnostics to be performed under control of the mobile services center.

The switching of messages between the various control units is performed by a regional processor EMRP ("extension module regional processor") in cooperation with a message distributor MD. The message distributor puts messages into HDLC format and converts messages from serial on the channel unit side to parallel. An additional EMRP is used to provide a human interface including a simple I/O terminal and various external alarms. Whereas routine message-routing functions are distributed throughout the various blocks in FIG. 2, intelligent decision-making functions, including directed retry functions, are performed by the central processor CP. The central processor CP is provided with one or more memories of the same type or different types in a manner well-known in the art.

Referring now to FIGS. 3-5, the call access method of the present invention will now be described in detail. When a mobile station attempts a call access, it sends an access message comprising three words followed by an additional two words representing a dialed number as shown in FIG. 3. Each of the words is provided with a parity field. The first word contains identifying information concerning the mobile station including its station class mark (SCM), defining the type of mobile station and its maximum output power, and the seven least significant digits of the mobile station number. The second word contains an additional three most significant digits of the mobile station number. Also in the second word is an order confirmation field whereby the mobile station may confirm its receipt of and response to orders from the mobile services center. The third word contains a serial number assigned to the mobile.

In response to a mobile access request of the type illustrated in FIG. 3, if the cell in which the mobile station is located is experiencing congestion, the mobile services center will then send a directed retry message of the type illustrated in FIG. 1b. In response thereto, the mobile station will then select the strongest of the candidate frequencies sent in the directed retry message over which to again send an access request. According to the present invention, however, the system upon sending a directed retry message stores temporarily (for a few seconds) a record identifying the mobile station and the cell to which the mobile station made its original access. Upon occurrence of directed retry, if a record of an access just previously is found, then the identity of the cell having just previously been determined to be congested is retrieved. Using this information, the preferred cell may again be checked to see if the previous congestion has been alleviated.

Whether or not a cell is congested may be determined by the mobile services center with reference to a channel memory 15 organized as illustrated in FIG. 4. Stored in the memory are lists for each of the cells of the currently available channels in that cell. The memory may constitute a shared resource between a channel reservation process RESERVE and a channel release process RELEASE in a manner well-known in the art. When a channel in a particular cell is to be reserved, the list of available channels in that cell is first checked to make sure that the list is not empty. If the list is empty, the cell is then known to be experiencing congestion. If the list contains one or more channels and is not empty, the first channel on the list is removed by adjusting a pointer so as to effectively remove the channel from the pool of available channels. When a channel is released, the channel is again added to the end of a list of available channels of the appropriate cell. Using the information contained in the channel memory of FIG. 4, central processor CP of the mobile services center executes an access process whereby calls are established whenever possible in the cell in which a requesting mobile station is located even on directed retry.

The essentials of the call access method of the present invention will first be explained with reference to steps in S1-S9 and S33 in FIG. 5. When an access request is received, it is first ascertained in step S1 whether the access is an original access or a directed retry access. If the access is an original access, an idle channel is sought in the cell ("cell X") in which the mobile station is located (S3). If a channel is available, it is seized and assigned to the mobile station in step S5; otherwise, a directed retry message is sent to the mobile station in step S7.

If the access attempt is determined to be a directed retry access, an idle channel is sought in the neighboring cell selected by the mobile station in response to the directed retry message, designated for convenience as cell Z. First, cell X is checked for available voice channels. If congestion has been alleviated in cell X with the result that an idle channel is found (step S8), the channel is seized and assigned (as usual, except that the assignment for the channel in cell X is sent from cell Z) to the mobile station in step S5. If no channel is available in cell X, cell Z is checked in step S9. If a channel is available in cell Z, the channel is seized and assigned (as usual) to the mobile station in step S5.

If an idle channel cannot be found in either the original cell X or the selected neighbor cell Z, then a reorder or release message is sent to the mobile station to inform the caller that service is temporarily unavailable (S33). The release message is sent in case of a terminating call to release the mobile station (the called party has not been notified yet at this stage).

To avoid unduly burdening the operation of cell Z, it may be desirable to limit the number of channels in cell Z that may be reserved for directed retries to a proportion of the channels allocated to cell Z. Other considerations may also influence the allocation of voice channels. For example, voice channels may be reserved for handoff, for new call setup, or for VIPs, such that although there may be voice channels free in a particular cell, they may not be available for a particular user in view of another, higher-priority use.

The proportion of calls successfully established and the proportion of calls established in the caller's original cell may both be increased so as to minimize interference using queuing techniques with respect to one or both of cells X and Z. Queuing relies on the fact that a mobile station does not require a reply to a directed retry attempt for approximately five seconds according to common radiotelephone specifications.

Now referring to FIG. 6, applying queuing techniques to cell X, if congestion is found in cell X on an original access, the request is then queued, i.e., placed in a queue or lists of requests for cell X maintained in the mobile switching center, in steps S13 and S15. Upon the occurrence of a subsequent corresponding directed retry access when no channel is available in cell X, an idle channel in cell Z is sought and reserved prior to again seeking an idle channel in the original cell X (steps S9 and S10). Instead of immediately seizing and assigning the reserved channel if no idle channel is found in cell X, however, with queuing, an idle channel is sought in cell X for the duration of a timeout period corresponding to the tolerable delay in replying to the mobile station's request (steps S12 and S14). If an idle channel is found in cell X before the timeout interval has run, the channel is seized and assigned to the mobile station assuming that the mobile station's original access request is at the front of the queue. If another mobile station has been waiting longer but is still within its timeout period, then that mobile station will be assigned the newly idle channel.

If it is determined in step S9 that no channel is available in neighboring cell Z, the request may be queued in cell Z also. An idle channel is then sought in both cells X and Z during the timeout interval (steps S29 and S31) with the first available channel being seized and assigned to the mobile station whose request is at the front of the queue. If no channel becomes available during the timeout period, a reorder message is then sent. The access request is then removed from the queue.

The number of channels in cell Z seized or reserved on behalf of mobile stations not belonging to cell Z (and waiting for a channel in cell X) may be limited to some predetermined number of channels or proportion of the channels assigned to cell Z. In other words, such reservations may be allowed but only if not too many reservations have already been made. Furthermore, such reservations may be conditional instead of absolute. For example, a channel reserved in cell Z while queuing for cell X is in progress may be used for a new call in or a handoff to cell Z if there is no other channel available.

By establishing calls whenever possible in the cell of origination, interference resulting from a call being established outside the originating cell may be significantly reduced. In addition, using queuing techniques, the proportion of calls that may be successfully established without the necessity of requiring reorder may be increased.

With reference to FIG. 2, an apparatus for implementing the inventive method includes first means for identifying a transmission as a retry of an attempted call access in the first cell by the mobile station. The invention further includes second means, responsive to the first means, for determining whether a traffic channel allocated to the second cell is available; and third means, responsive to the second means, for reserving for the call access attempt the traffic channel allocated to the second cell if the determination made by the second means is affirmative. Additionally, the apparatus may include fourth means, responsive to the first means, for determining whether a traffic channel allocated to the first cell becomes available during a waiting interval; fifth means, responsive to the fourth means, for assigning the traffic channel allocated to the first cell if the determination made by the fourth means is affirmative; and sixth means, responsive to the fourth means, for assigning the traffic channel reserved by the third means, if any, if the determination made by the fourth means is negative.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A call access method in a cellular mobile radiotelephone system having a plurality of established cells each in communication with an exchange, comprising the steps of:

sending a directed retry message in response to an attempted call access in a first cell experiencing congestion;

detecting as a directed retry call access attempt a subsequent retry in a second cell of said attempted call access; and if a traffic channel allocated to said first cell is available, assigning from said second cell said traffic channel allocated to said first cell.

2. The call access method of claim 1 comprising the further steps of:

placing a record of said attempted call access in a queue for said first cell; and waiting up to a predetermined waiting interval for a traffic channel allocated to said first cell to become available.

3. The call access method of claim 2 wherein if no traffic channel allocated to said first cell is available but a traffic channel allocated to said second cell is available, said traffic channel allocated to said second cell is assigned from said second cell.

4. The call access method of claim 3 comprising the further step of:

if a traffic channel allocated to said second cell is available, reserving for said call access attempt said traffic channel allocated to said second cell at a beginning of said waiting interval.

5. The call access method of claim 4 comprising the further steps of:

monitoring a number of traffic channels allocated to said second cell and reserved for directed retry call access attempt; and reserving a traffic channel allocated to said second cell for a directed retry call access attempt only if said number is less than a predetermined limit.

6. The call access method of claim 5 wherein reservations of channels for directed retry call access attempts may be broken by calls of higher priority.

7. The call access method of claim 3 comprising the further step of:

if no traffic channel allocated to said first cell is available and also no traffic channel allocated to said second cell is available, placing a record of said attempted call access in a queue for said second cell.

8. A method for controlling call access in a cellular mobile radiotelephone system having a first cell experiencing congestion and a second cell, comprising the steps of:

(a) sending a directed retry message in response to an attempted call access in the first cell;

(b) detecting a subsequent retry in the second cell of the attempted call access;

(c) determining whether a traffic channel allocated to the first cell has become available since the directed retry message was sent in step (a); and (d) assigning, from the second cell, the traffic channel allocated to the first cell if the determination in step (c) is affirmative.

9. The call access method of claim 8 comprising the additional steps, to be executed if the determination in step (c) is negative, of (e) determining whether a traffic channel allocated to the second cell is available; and (f) assigning, from the second cell, the traffic channel allocated to the second cell if the determination in step (e) is affirmative.

10. The call access method of claim 9 comprising the further steps to be executed between steps (c) and (d) of:

placing a record of the attempted call access in a queue for the first cell; and waiting up to a predetermined waiting interval for a traffic channel allocated to the first cell to become available.

11. The call access method of claim 10 comprising the further step of:

(g) if no traffic channel allocated to the first cell is available and also no traffic channel allocated to the second cell is available, placing a record of the attempted call access in a queue for the second cell.

12. A method of controlling call access in a cellular mobile radiotelephone system having a first cell experiencing congestion and a second cell, comprising the steps of:

(a) sending a directed retry message in response to an attempted call access in the first cell;

(b) detecting as a directed retry call access attempt a subsequent retry in the second cell of the attempted call access;

(c) determining whether a traffic channel allocated to the second cell is available;

(d) reserving for the call access attempt the traffic channel allocated to the second cell if the determination in step (c) is affirmative;

(e) determining whether a traffic channel allocated to the first cell becomes available during a waiting interval;

(f) assigning, from the second cell, the traffic channel allocated to the first cell if the determination in step (e) is affirmative; and (g) assigning, from the second cell, the traffic channel reserved in step (d), if any, if the determination in step (e) is negative.

13. The call access method of claim 12 comprising the further steps of:

(h) monitoring a number of traffic channels allocated to the second cell and reserved for directed retry call access attempts; and (i) reserving a traffic channel allocated to the second cell for a directed retry call attempt in step (d) only if said number is less than a predetermined limit.

14. In a cellular mobile radiotelephone system having a mobile station and a fixed control station servicing a first cell experiencing congestion and a second cell, a method carried out by the fixed control station for controlling call access comprising the steps of:

identifying a transmission as a retry of an attempted call access in the first cell by the mobile station;

determining whether a traffic channel allocated to the first cell has become available since the retry was directed; and assigning the traffic channel allocated to the first cell if the determination made in the preceding step is affirmative.

15. In a cellular mobile radiotelephone system having a mobile station and a fixed control station servicing a first cell experiencing congestion and a second cell, a method carried out by the fixed control station for controlling call access comprising the steps of:

identifying a transmission as a retry of an attempted call access in the first cell by the mobile station;

determining whether a traffic channel allocated to the second cell is available;

reserving for the call access attempt the traffic channel allocated to the second cell if the determination made in the preceding step is affirmative;

determining whether a traffic channel allocated to the first cell becomes available during a waiting interval;

assigning the traffic channel allocated to the first cell if the determination made in the preceding step is affirmative, otherwise assigning the traffic channel in the reserving step, if any, if the determination made in the preceding step is negative.

16. In a cellular mobile radiotelephone system having a mobile station and a fixed control station servicing a first cell experiencing congestion and a second cell, an apparatus in the fixed control station for controlling call access, the apparatus comprising:

first, means for identifying a transmission as a retry of an attempted call access in the first cell by the mobile station;

second means, responsive to the first means, for determining whether a traffic channel allocated to the first cell has become available since the retry was directed; and third means, responsive to the second means, for assigning the traffic channel allocated to the first cell if the determination made by the second means is affirmative.

17. In a cellular mobile radiotelephone system having a mobile station and a fixed control station servicing a first cell experiencing congestion and a second cell, an apparatus in the fixed control station for controlling call access, the apparatus comprising:

first means for identifying a transmission as a retry of an attempted call access in the first cell by the mobile station;

second means, responsive to the first means, for determining whether a traffic channel allocated to the second cell is available;

third means, responsive to the second means, for reserving for the call access attempt the traffic channel allocated to the second cell if the determination made by the second means is affirmative;

fourth means, responsive to the first means, for determining whether a traffic channel allocated to the first cell becomes available during a waiting interval;

fifth means, responsive to the fourth means, for assigning the traffic channel allocated to the first cell if the determination made by the fourth means is affirmative; and sixth means, responsive to the fourth means, for assigning the traffic channel reserved by the third means, if any, if the determination made by the fourth means is negative.

18. A call access method in a cellular mobile radiotelephone system having a plurality of established cells each in communication with an exchange, comprising the steps of:

sending a directed retry message in response to an attempted call access in a first cell experiencing congestion;

detecting a subsequent retry in a second cell of said attempted call access;

determining, without first reserving a traffic channel in said second cell, if a traffic channel allocated to said first cell is available; and if a traffic channel allocated to said first cell is available, assigning from said second cell said traffic channel allocated to said first cell.

* * * * *